March 1, 1966 C. R. WEIHE, JR 3,237,755
CONVEYOR FOR DISHWASHING SYSTEMS
Filed Feb. 25, 1965
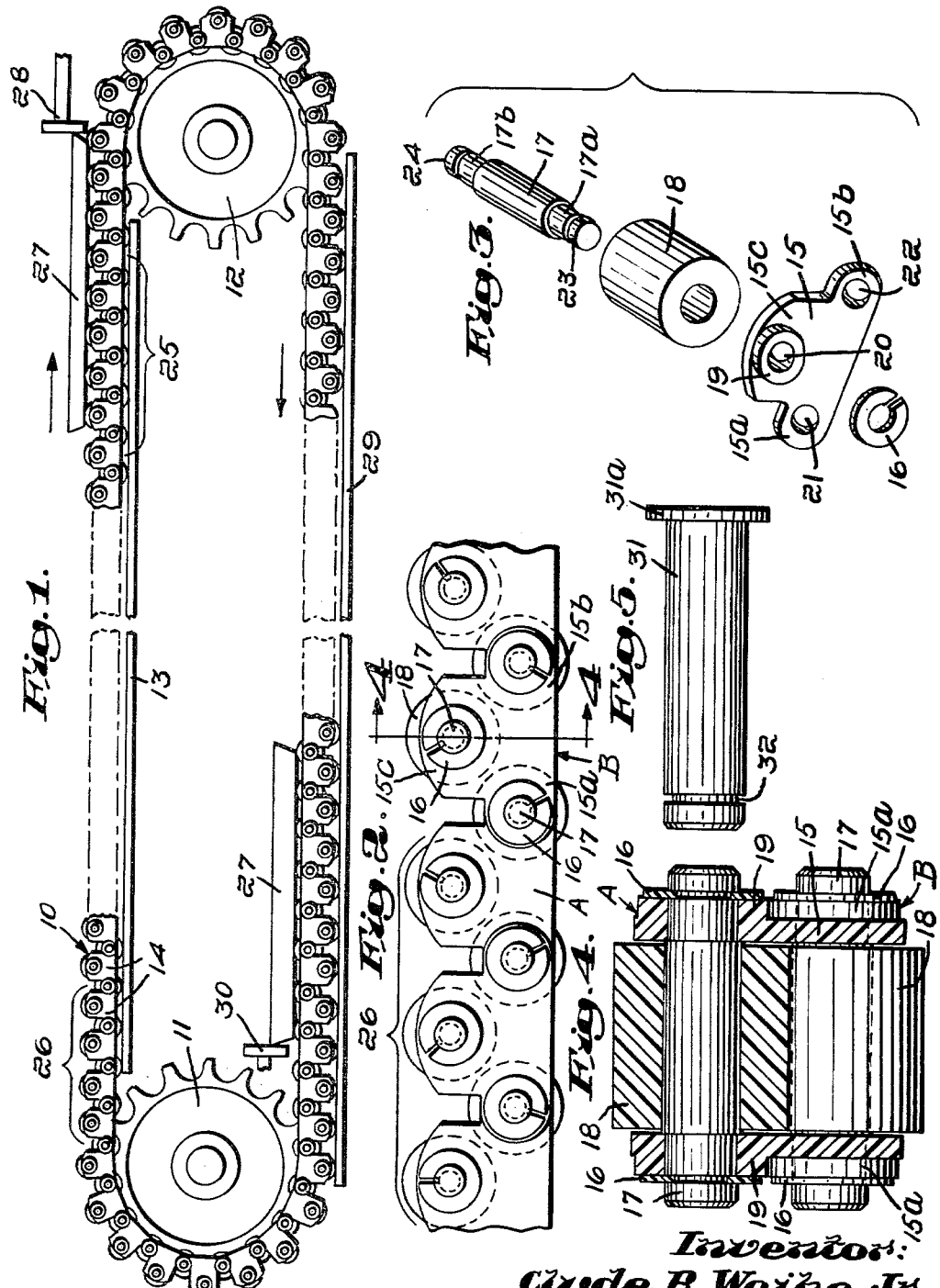
Inventor:
Clyde R. Weihe, Jr.,
by Arthur D. Thomson
Attorney

United States Patent Office 3,237,755
Patented Mar. 1, 1966

3,237,755
CONVEYOR FOR DISHWASHING SYSTEMS
Clyde R. Weihe, Jr., Needham, Mass., assignor to Adamation, Inc., Newton, Mass., a corporation of Massachusetts
Filed Feb. 25, 1965, Ser. No. 435,292
3 Claims. (Cl. 198—183)

This invention relates to conveyors and pertains more particularly to conveyors used in commercial dishwashing systems for transporting trays or racks of dishes from one station to another. The present application is a continuation-in-part of my previous application Serial No. 276,265 filed April 29, 1963, now abandoned.

Most of the common types of conveyors used in dishwashing machines and dish collection and distribution systems are equipped with manual or automatic stop motion mechanisms which stop the conveyor in case one of the trays or racks becomes jammed or reaches a loading or unloading table. Otherwise the trays following are likely to pile up on one another and cause dishes to break or fall off.

The principal object of the invention is to provide a conveyor, which may be left running continuously without causing trays or racks placed on it to pile up, thus eliminating the need for costly automatic controls or constant supervision by an operator. Another object is to provide a conveyor which will efficiently transport the trays in the normal manner when they are moving freely. Still another object is to provide a conveyor with both advance and return run portions either of which will safely carry trays of dishes even though one tray in the group may be stopped. Another object is to provide a conveyor which is simple, inexpensive, light in weight, and durable, and can be manufactured in various lengths from a small number of stock parts. Other objects, advantages, and novel features of the invention will be apparent from the following description.

The conveyor consists, in general, of an endless chain driven in a vertical plane by sprockets and composed of links. The links are joined together by pins which serve as shafts for a set of main rollers which project below the chain and roll along a table. The links carry upper extensions on which a set of auxiliary rollers are mounted. The trays or other articles carried on the conveyor rest on the auxiliary rollers and are ordinarily carried along by them. If movement of the articles is obstructed, the articles will roll on the auxiliary rollers so that the conveyor continues to move freely.

On the return run of the conveyor, the chain is disposed upside down. A table may be placed under the return run portion and the auxiliary rollers, which are now on the bottom of the chain will roll along the table. Articles placed on this portion of the conveyor will rest on the main rolls which are now on top. If the movement of the articles is obstructed the main rollers permit the conveyor to continue to move freely. It is understood that two or more chains of the type described may be used side by side.

In the drawings illustrating the invention:

FIG. 1 is a side elevation, partly broken away, of a conveyor constructed according to the invention;

FIG. 2 is an enlarged fragmentary side view of a piece of the chain used in the conveyor;

FIG. 3 is an exploded view of the four types of parts used in constructing the chain;

FIG. 4 is a cross-section taken along line 4—4 of FIG. 2; and

FIG. 5 is a side view of a modified form of pin used in the links.

The chain, generally indicated by the numeral 10, passes around a pair of sprockets 11 and 12, either of which may be driven in the customary manner. The upper straight run of the chain passes over a table 13. The chain is composed of links 14.

The four basic parts from which the chain is constructed consist of an inverted T-shaped plate 15, a split washer 16, a pin 17, and a tubular roller 18. All the parts are preferably of molded plastic. The plate has foot portions 15a and 15b, and a stem portion 15c. The stem portion carries a boss 19 of a thickness equal to that of the plate. The pin 17 has reduced end portions 17a and 17b of a diameter to pass through any of the holes 20, 21 or 22 in the plate. The end portions are provided with grooves 23 and 24, and the washer 16 is of an internal diameter to fit into these grooves.

A link is assembled by putting three pins 17 through three rollers 18, assembling a pair of plates 15 onto the ends of the pins, and snapping a pair of washers 16 into the grooves 23 and 24 of the pin which passes through holes 20 of the plates. Alternate links in a chain are assembled with the plates 15 reversed so that the bosses 19 project inward. The link generally designated A in FIG. 2 has the bosses 19 on the outside, and that designated B has the bosses on the inside. The inturned bosses space the plates of the B links from the rollers so that the foot portions 15a and 15b can overlap the adjacent foot portions of the A links. The pins 17 which pass through the holes 21 and 22 of an A link also pass through the aligned holes in the overlapping foot portions of the adjacent B links, and are secured by pairs of washers 16.

The lower rollers carried by the pins which connect the foot portions of successive links serve as the main set of rollers, generally designated 25. The upper rollers mounted on the stem portions of the link plates serve as the auxiliary set of rollers, generally designated 26.

The set of rollers 25 projects somewhat below the links and run along on table 13 in the upper straight run portion of the path of the chain. The set of rollers 26 projects above the chain in this region. Trays or racks 27 ride on rollers 19. As long as the trays are free to move they are carried along by the chains.

FIG. 1, the leading tray is shown engaged with a stop 28, which may, for example, be the rim of an unloading table. When a tray is thus stopped, rollers of set 26 will roll along its under side. The friction between the trays and these rollers is so low that a succeeding tray which runs into the stationary tray will stop without riding up.

A second table 29 is disposed under the lower straight run portion of the chain. The set of rollers 26, which is on the bottom of the chain in this portion of its run, rides on table 29. Trays 27 placed on the lower run ride on the set of rollers 25 which is on top of the chain in this region. If one of the trays engages a stop 20 at the left hand end of the lower run, the chain will run freely under it, as the set of rollers 26 will run along the bottom surface of the tray.

FIG. 5 shows an alternative form of pin 31 having a flange 31a at one end and a groove 32 at the other. This pin is inserted through aligned holes in a pair of plates 15, with a roller 18 between, and secured by a washer 16 snapped into the groove 32. Sections of chain are assembled with alternating A and B links as previously described.

Chains of this construction can be assembled in any desired length, using the four basic parts here described. The parts may be made of metal, but plastic is preferable as it is lighter and makes a chain which is quieter in operation. The rollers are preferably made of a low-friction, non-galling material such as hard nylon.

The chain has an equal number of rollers in the main and auxiliary sets, and the rollers are equally spaced, so that the conveyor has the same area of bearing surface, whichever set is down, and the load is evenly distributed.

For many installations, a complete conveyor consists of a pair of chains such as that just described, spaced apart by less than the width of the articles to be carried, and driven in unison. If the articles are wide, or for any other reason, it is desirable to support them at more than two points, or if the conveyor is to be used for articles of varying widths, any number of chains spaced according to the requirements of the installation may be used.

In a multiple chain conveyor, the rolling contact between the chains and the trays or racks eliminate the undue wear and friction which might otherwise result from temporary inequalities in the speeds of the various chains.

When in operation, the conveyor runs continuously. The device eliminates need for complicated automatic controls, and frequent stopping and re-starting which puts a considerable strain on the drive motors when the conveyor is heavily loaded. If one tray stops, others behind it will come to rest without riding up on each other and causing breakage of dishes. A tray may be held stationary at either end of the conveyor for the length of time necessary for any operation. For example, when such a conveyor is used to carry racks of clean dishes from the dishwasher to a storage area, an operator at the delivery end can unload and put away the dishes and place the empty rack on the return run. Another operator can remove the collected empty racks at the return end whenever convenient without interferring with the unloading operation.

What is claimed is:

1. A flexible chain for dishwasher conveyor systems comprising a number of links connected together, each link being formed of identical parts as follows: a pair of T-shaped side plates disposed in spaced relationship and each having sidewardly extending foot portions and an upwardly extending stem portion, a first pin secured between said stem portions, a first roller carried on side pin; the foot portions of each link overlapping the adjacent foot portions of the adjoining link, and each link including a second pin connecting the overlapping portions together and a second roller mounted on said second pin, each of said plates having a projecting boss on its stem portion, the bosses of every other link being disposed inward and the bosses of the intervening links being disposed outward.

2. A chain as described in claim 1, said first and second pins each having two reduced end portions with grooves therein, and said pins carrying split washers disposed in said grooves.

3. A chain as described in claim 1, each of said pins having a flange on one end and a reduced portion with a groove therein on the other end, and said pins carrying split washers disposed in said grooves.

References Cited by the Examiner
UNITED STATES PATENTS

| | | | |
|---|---|---|---|
| 914,188 | 3/1909 | Robinson | 198—183 |
| 1,093,815 | 4/1914 | Whittier | 198—159 |
| 2,553,646 | 5/1951 | Field | 198—189 |
| 2,976,981 | 3/1961 | Peras | 198—127 |
| 3,099,346 | 7/1963 | Maas | 74—254 |

EVON C. BLUNK, *Primary Examiner.*

RICHARD E. AEGERTER, *Examiner.*